(12) United States Patent
Stahl

(10) Patent No.: US 6,886,787 B2
(45) Date of Patent: May 3, 2005

(54) DOLLY FOR SUPPORTING AND TRANSPORTING BAKERY TRAYS

(76) Inventor: Edward L. Stahl, 2210 Kennebunk La., Tyler, TX (US) 75703

( * ) Notice: Subject to any disclaimer, the term of this patent is extended or adjusted under 35 U.S.C. 154(b) by 0 days.

(21) Appl. No.: 10/143,841

(22) Filed: May 14, 2002

(65) Prior Publication Data

US 2003/0213878 A1 Nov. 20, 2003

(51) Int. Cl.⁷ .............................. A47K 1/04; B62B 1/00
(52) U.S. Cl. .................. 248/129; 206/508; 248/346.01; 280/79.11; D34/23
(58) Field of Search ................................ 248/122, 127, 248/128, 346.01, 346.02; 206/507, 506, 505, 508, 511, 509, 512; 108/57.26, 57.28; 280/79.11, 33.998

(56) References Cited

U.S. PATENT DOCUMENTS

| | | | |
|---|---|---|---|
| 2,689,469 A | 9/1954 | Happe et al. .................. 65/61 |
| 2,707,351 A | 5/1955 | Walker .......................... 47/39 |
| 2,947,548 A | 8/1960 | Bard .......................... 280/79.2 |
| 4,060,252 A | 11/1977 | Mowery ................. 280/79.1 R |
| 4,106,624 A | * 8/1978 | Thurman ..................... 206/507 |
| D257,767 S | 1/1981 | Maza et al. .................. D12/31 |
| D257,823 S | 1/1981 | Maza et al. .................. D12/31 |
| 4,519,503 A | * 5/1985 | Wilson ........................ 206/505 |
| 4,720,155 A | 1/1988 | Schildkraut et al. ......... 439/108 |
| 4,822,066 A | 4/1989 | Rehrig ..................... 280/79.11 |
| 4,824,129 A | 4/1989 | Rehrig ..................... 280/79.11 |
| 4,838,176 A | 6/1989 | Bowser, Sr. et al. ....... 108/53.3 |
| 4,936,458 A | * 6/1990 | Tabler et al. ............... 206/507 |
| 5,074,572 A | 12/1991 | Delmerico et al. ....... 280/47.34 |
| D327,557 S | 6/1992 | Juergens ....................... D34/11 |
| D328,172 S | 7/1992 | Juergens ....................... D34/23 |
| 5,184,836 A | 2/1993 | Andrews, Jr. et al. ...... 280/79.5 |
| 5,186,330 A | * 2/1993 | McClure ..................... 206/508 |
| D349,995 S | 8/1994 | Cassel et al. ................. D34/23 |
| 5,445,396 A | 8/1995 | Sebor ..................... 280/33.998 |
| D370,757 S | 6/1996 | Loftus et al. ................ D34/23 |
| 5,564,805 A | * 10/1996 | Dickinson ................ 312/249.8 |
| D376,453 S | 12/1996 | Park ........................... D32/53 |
| D378,154 S | 2/1997 | Presnell ....................... D34/23 |

(Continued)

OTHER PUBLICATIONS

"Sketch A", is a drawing depicting a dolly which was on sale in the U.S. in Dec., 1999.
"Sketch B", "Sketch C" and "Sketch D" are drawings depicting a dolly offered for sale in the U.S. in Dec., 2000.

Primary Examiner—Leslie A. Braun
Assistant Examiner—Tan Le
(74) Attorney, Agent, or Firm—Katten Muchin Zavis Rosenman

(57) ABSTRACT

A load carrying device configured to support and transport a tray comprising a platform configured to support the tray, rolling means depending from the platform, and a retainer disposed on the platform and configured to loosely abut the tray to limit movement of the tray across the platform when the tray is supported on the platform. The retainer limits movement of the tray in all directions across the platform when the tray is supported on the platform. The retainer projects upwardly from the platform and presents a surface opposing horizontal movement of the tray when the tray is supported on the platform. The tray includes a bottom surface, a first pair of opposed walls projecting upwardly from the bottom surface, a second pair of opposed walls projecting upwardly from the bottom surface and integrally joined with the first pair of opposed walls, and a plurality of support members projecting below the bottom surface and configured to be supported by the platform, wherein the bottom surface is configured to clear the retainer when the support members are supported on the platform, and wherein the support members oppose and loosely abut the retainer when the support members are supported on the platform.

11 Claims, 8 Drawing Sheets

U.S. PATENT DOCUMENTS

| | | | |
|---|---|---|---|
| D390,314 S | 2/1998 | Chen | D34/23 |
| D398,434 S | 9/1998 | Agtuca | D34/23 |
| 5,823,549 A | 10/1998 | Morgan, Jr. | 280/33.998 |
| 5,881,902 A * | 3/1999 | Ackermann | 206/509 |
| 5,896,992 A * | 4/1999 | McGrath | 206/507 |
| 5,921,566 A | 7/1999 | Kern et al. | 280/79.11 |
| D420,188 S | 2/2000 | Betcher | D34/23 |
| 6,105,980 A * | 8/2000 | Cino et al. | 280/33.998 |
| 6,199,879 B1 * | 3/2001 | Cino et al. | 280/33.998 |
| 6,260,706 B1 | 7/2001 | Koefelda | 206/505 |
| 6,273,259 B1 | 8/2001 | Stahl | 206/511 |
| D448,536 S | 9/2001 | Treschitta | D34/23 |
| D456,972 S | 5/2002 | Blason et al. | D34/23 |

* cited by examiner

US 6,886,787 B2

DOLLY FOR SUPPORTING AND TRANSPORTING BAKERY TRAYS

FIELD OF INVENTION

The present invention relates to dollies, and more particularly, dollies for supporting and transporting trays for baked goods.

BACKGROUND OF THE INVENTION

Trays are widely available to facilitate the storing and transporting of baked goods. Typically, such trays are formed from injection moulded plastic and are rectangular in shape. To facilitate storage and transport, such trays also typically include features which lend themselves to stacking upon one another.

Dollies are available and configured to facilitate the transportation of a plurality of stacked trays. However, existing dollies do not effectively lock the stacked trays onto the dollies, thereby making their transportation more challenging. Further, existing dollies are typically oversized to accommodate seating of trays, and are, therefore, space inefficient.

SUMMARY OF THE INVENTION

In a broad aspect, the present invention provides a load carrying device configured to support and transport a tray comprising a platform configured to support the tray, rolling means depending from the platform, and a retainer disposed on the platform and configured to loosely abut the tray to limit movement of the tray across the platform when the tray is supported on the platform.

In a further aspect, the retainer limits movement of the tray in all directions across the platform when the tray is supported on the platform.

In a further aspect, the retainer projects upwardly from the platform and presents a surface opposing horizontal movement of the tray when the tray is supported on the platform.

In a further aspect, the retainer projects upwardly from the platform and presents a surface to opposing all directions of movement of the tray across the platform when the tray is supported on the platform.

In a further aspect, the retainer opposes the tray when the tray is supported on the platform.

In a further aspect, the tray includes a bottom surface, a first pair of opposed walls projecting upwardly from the bottom surface, a second pair of opposed walls projecting upwardly from the bottom surface and integrally joined with the first pair of opposed walls, and a plurality of support members projecting below the bottom surface and configured to be supported by the platform, wherein the bottom surface is configured to clear the retainer when the support members are supported on the platform, and wherein the support members oppose and loosely abut the retainer when the support members are supported on the platform.

In a further aspect, the platform includes wells configured to receive rolling means of an identical load carrying device when the identical load carrying device is stacked upon the platform.

In a further aspect, the platform includes an upper surface and a lower surface, and wherein the upper surface is configured to support the tray.

In a further aspect, the tray includes a bottom surface, a first pair of opposed walls projecting upwardly from the bottom surface, a second pair of opposed walls projecting upwardly from the bottom surface and integrally joined with the first pair of opposed walls, and a plurality of support members projecting below the bottom surface and configured to be supported on the upper surface.

In yet a further aspect, the upper surface includes a perimeter, and wherein the retainer comprises a raised surface disposed vertically above and integrally joined by a retainer wall to the upper surface, wherein the raised surface is spaced inwardly from the perimeter, and wherein the raised surface is configured to support the bottom surface of the tray when the support members are supported on the upper surface.

In a further aspect, the support members oppose the retainer wall when the support members are supported on the platform.

In a further aspect, the support members loosely abut the retainer wall.

In a further aspect, the raised surface includes stiffening means to mitigate buckling of the raised surface when supporting the bottom surface of the tray.

In a further aspect, the raised surface includes a perimeter and a recessed channel extending adjacent the perimeter, wherein the stiffening means comprise a plurality of ribs intersecting the channel.

In a further aspect, the raised surface includes a perimeter and a recessed channel extending adjacent and substantially about the entire perimeter, wherein the stiffening means comprise a plurality of ribs intersecting the channel.

In yet a further aspect, the stiffening means are defined by corrugations provided in the raised surface.

In yet a further aspect, the raised surface includes an aperture spaced from the perimeter of the raised surface.

In another aspect, the upper surface includes wells configured to receive rolling means of an identical load carrying device when the identical load carrying device is stacked upon the upper surface.

BRIEF DESCRIPTION OF THE DRAWINGS

The embodiments of the present invention are described below with reference to the accompanying drawings in which.

DETAILED DESCRIPTION

Figure 7:
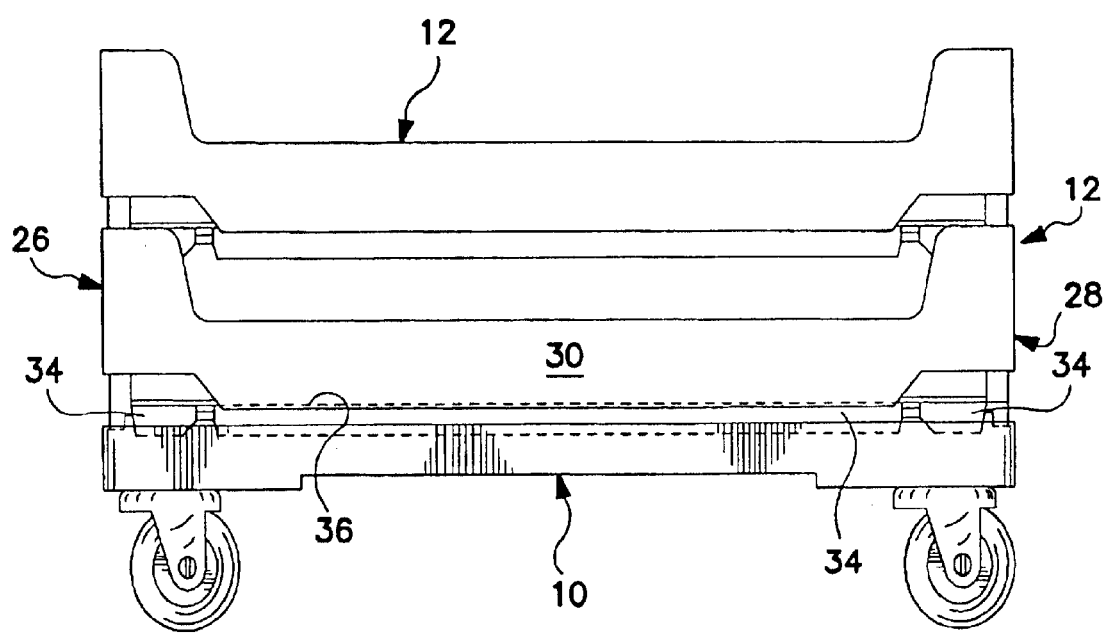
FIG. 7 is a side elevation view of two typical stacked bakery trays, shown stacked upon an embodiment of the dolly of the present invention.
Figure 8:
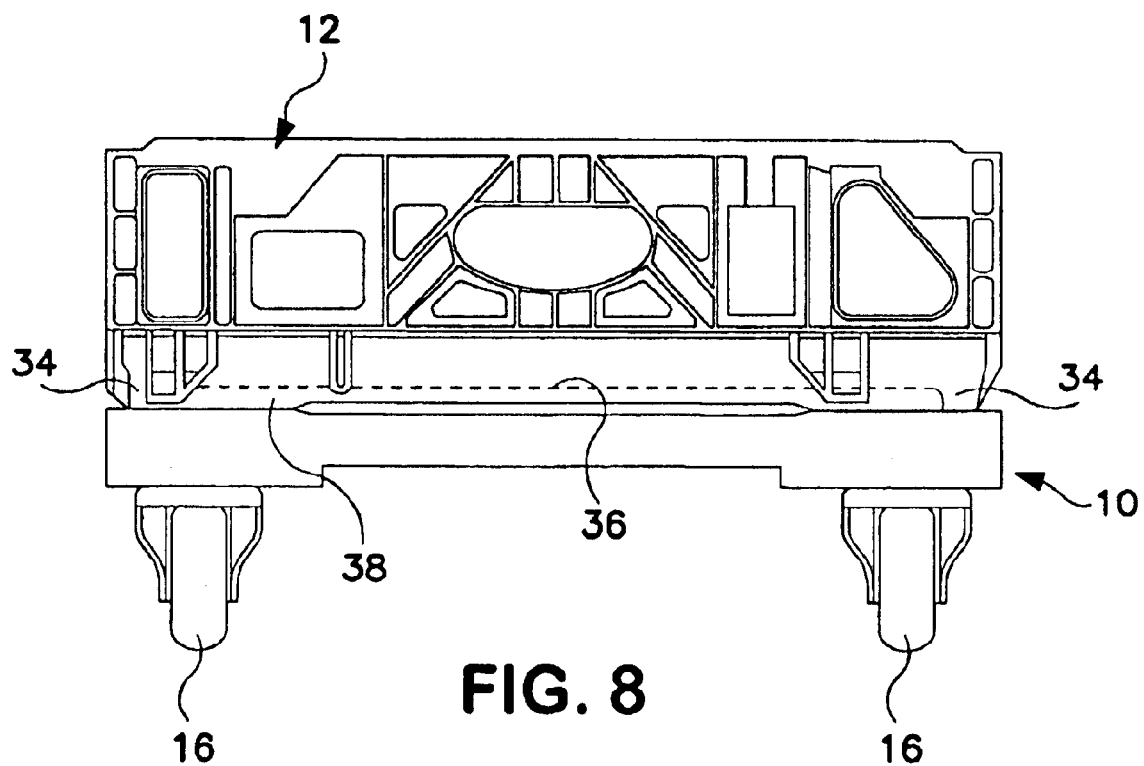
FIG. 8 is an end elevation view showing one of the bakery trays illustrated in FIG. 7, stacked upon an embodiment of the dolly of the present invention.

Referring to FIGS. 1–5 and 8, the present invention provides a load carrying device 10 configured to support and transport a tray 12 (see FIG. 9), or a plurality of stacked trays (see FIG. 7). Suitable trays include those configured for the storage and transport of baked goods.

Figure 1:
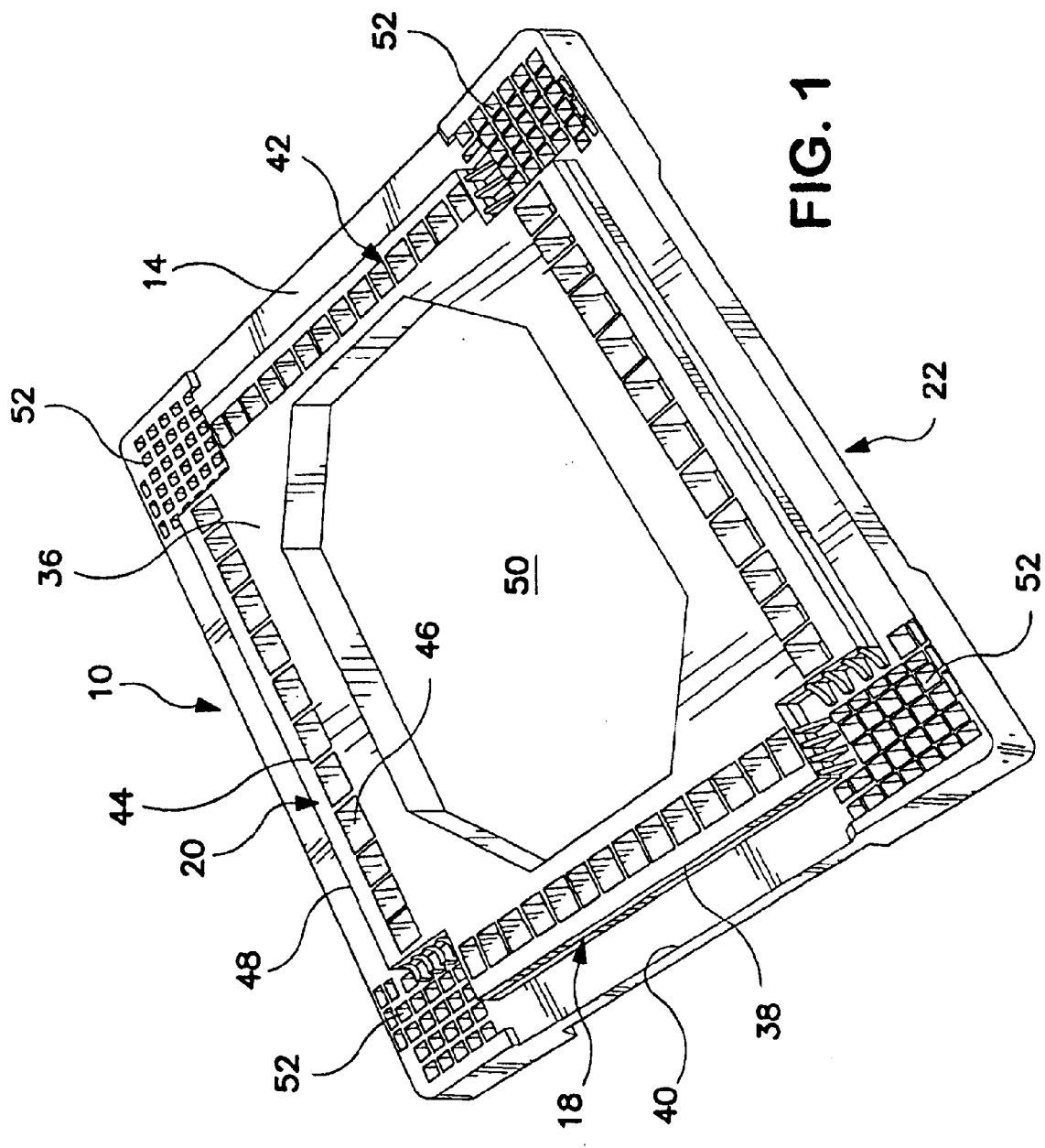
FIG. 1 is a top perspective view of an embodiment of the dolly of the present invention.
Figure 2:
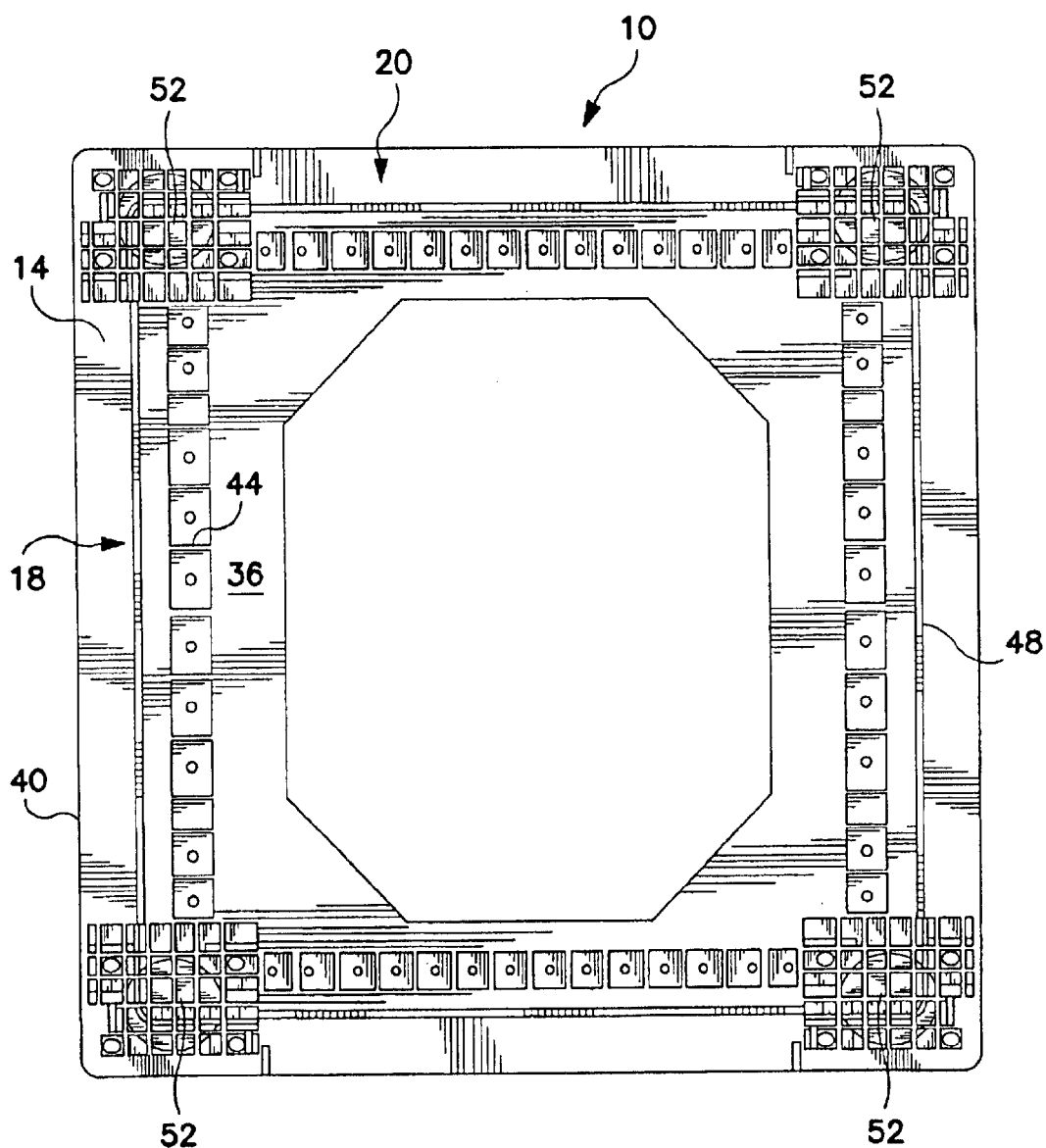
FIG. 2 is a top plan view of the dolly shown in FIG. 1.
Figure 3:
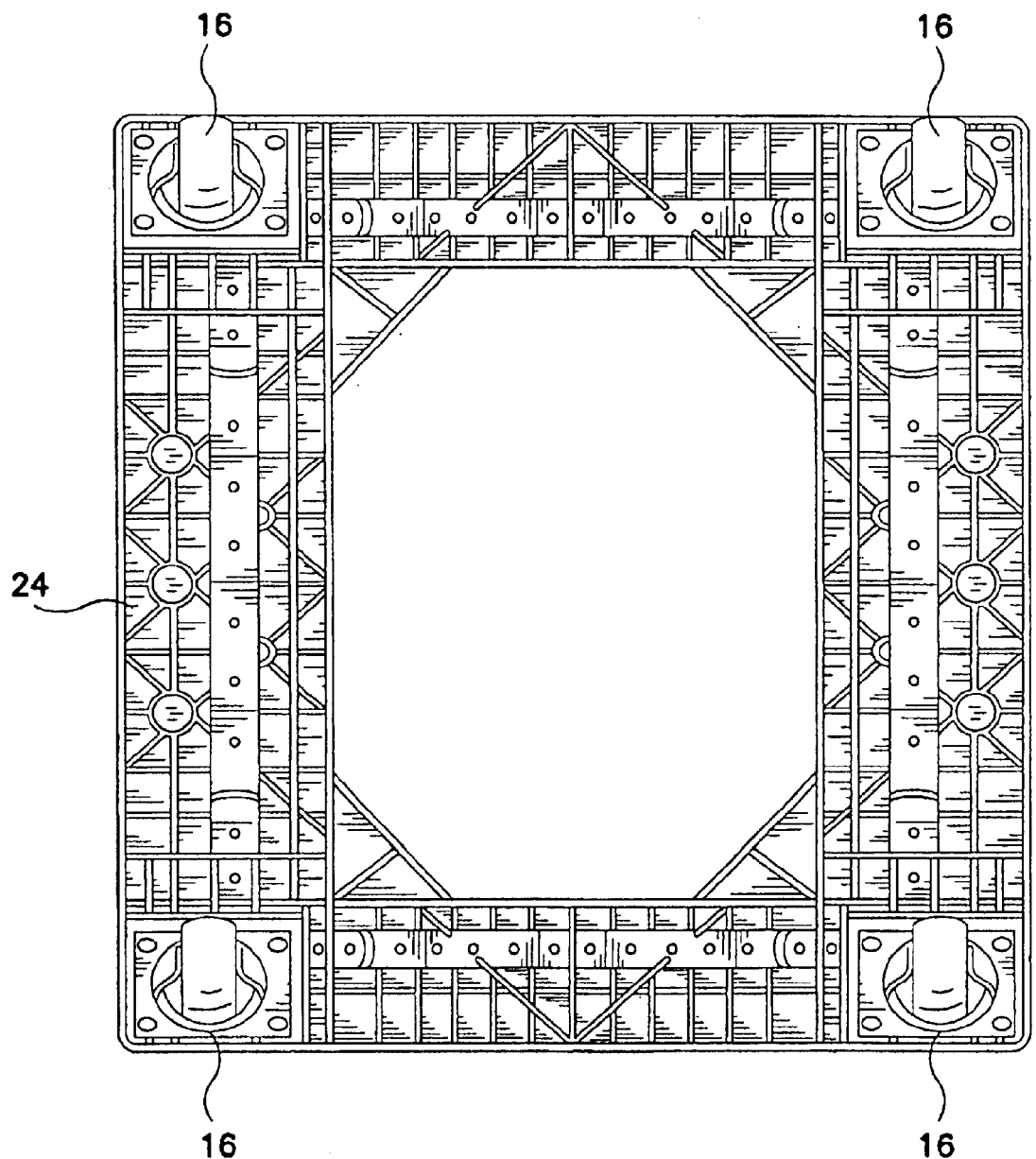
FIG. 3 is a bottom plan view of the dolly shown in FIG. 1.
Figure 4:
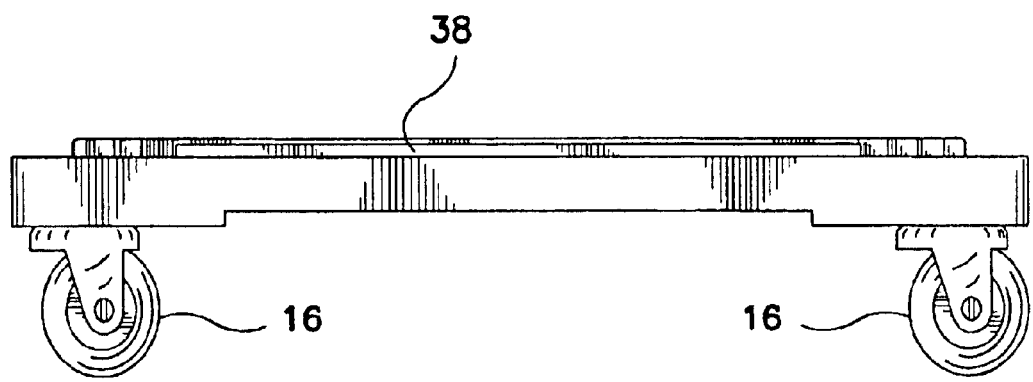
FIG. 4 is a side elevation of the dolly shown in FIG. 1.
Figure 5:
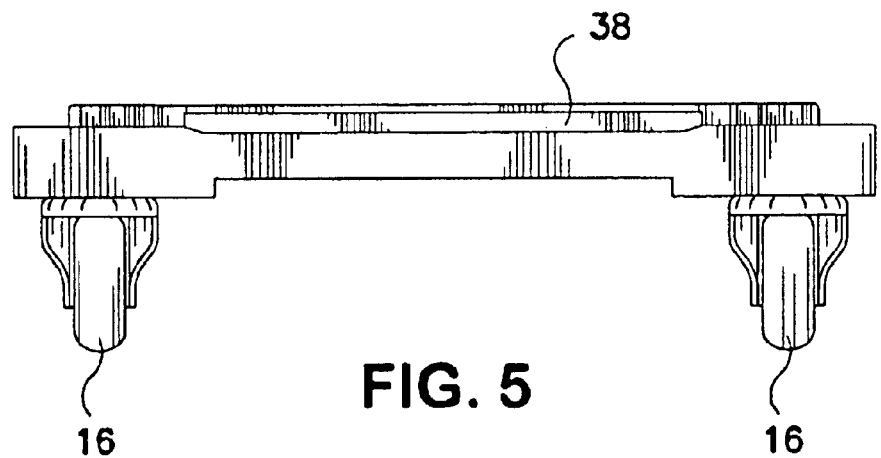
FIG. 5 is an end elevation view of the dolly shown in FIG. 1.
Figure 6:
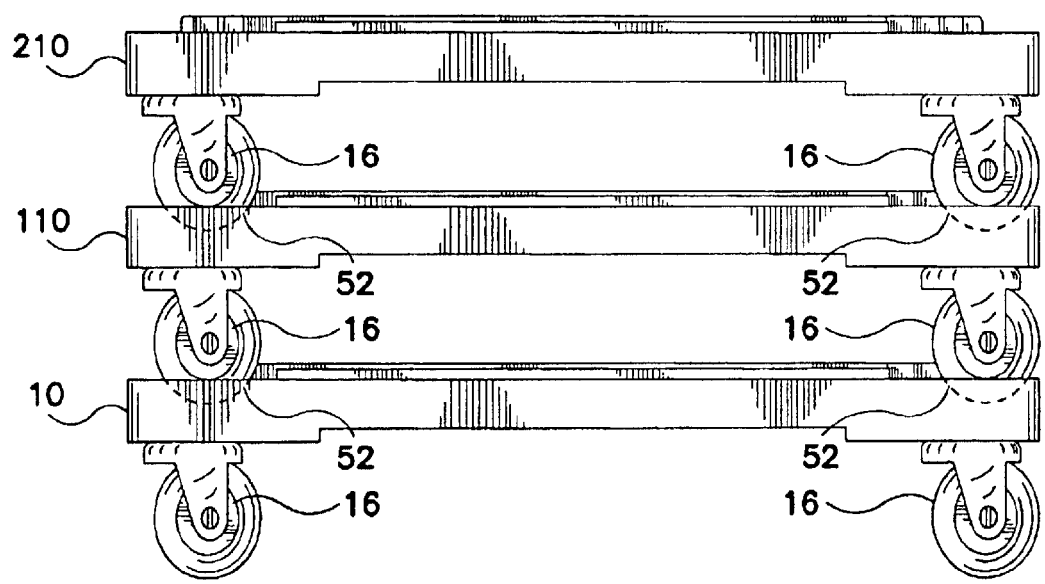
FIG. 6 is a side elevation view of three dollies shown in stacked configuration.

The load carrying device 10 is also configured to be stackable with other identical load carrying devices 110, 210. This facilitates ease of storage of several load carrying devices 10, 110, 210. In this respect, FIG. 6 illustrates this feature of the present invention, wherein three identical load carrying devices 10, 110, 210 are shown stacked upon one another in stacked configuration.

The load carrying device includes a platform 14, rolling means 16 and a retainer 18. The platform 14 is configured to support the tray 12. The platform 14 includes an upper surface 20 and a lower surface 22. The tray 12 is intended to rest upon and be supported by the upper surface 20.

Figure 9:
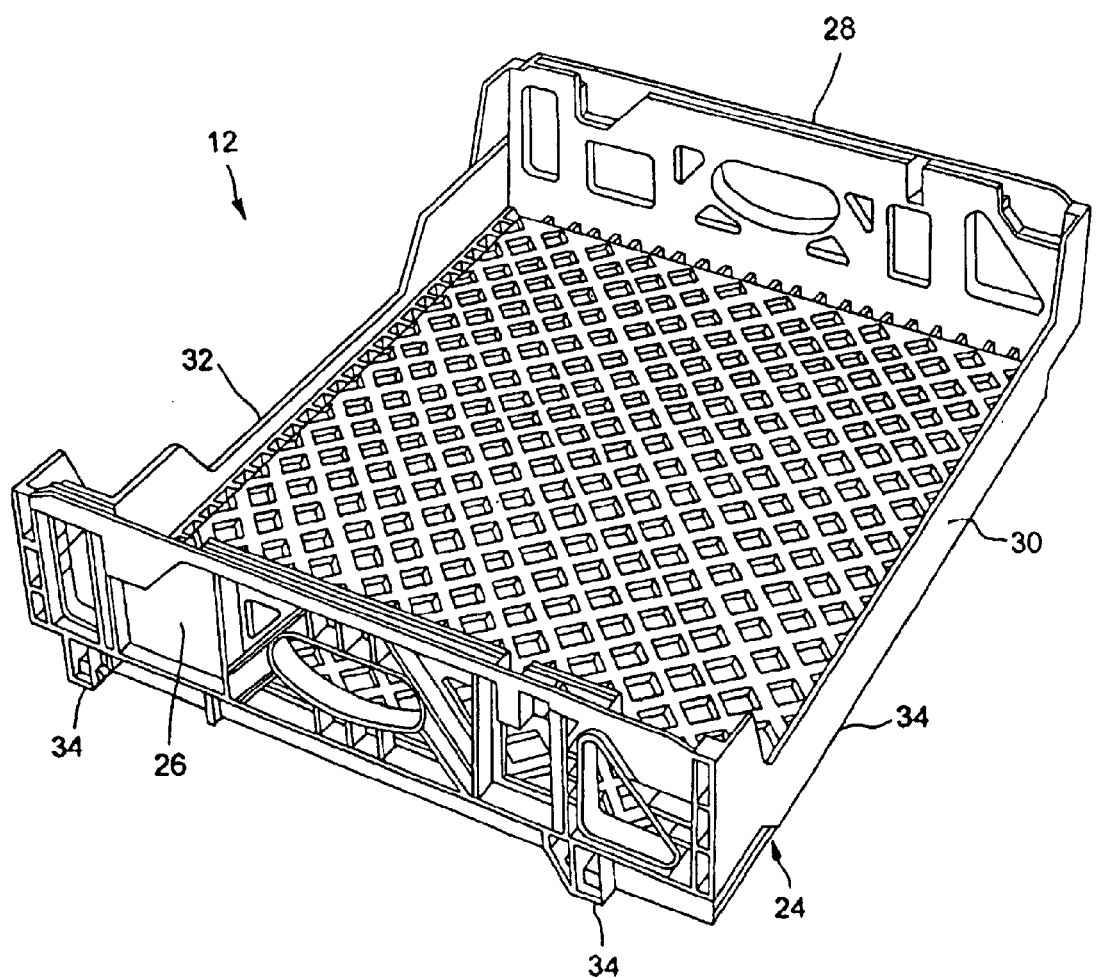
FIG. 9 is a top perspective view of a typical bakery tray.

Referring to FIG. 9, the tray 12 includes a bottom surface 24, a first pair of opposed walls 26, 28, a second pair of opposed walls 30, 32, and a plurality of support members 34. The first pair of opposed walls 26, 28 project upwardly from the bottom surface 24. The second pair of opposed walls 30, 32 project upwardly from the bottom surface 24 and are integrally joined with the first pair of opposed walls 26, 28. The plurality of support members 34 project below the bottom surface 24 and are configured to be supported by the platform 14. The support members 34 may include any element configured to distribute the load of an empty tray 12, or a tray 12 containing goods, such as baked goods, onto the load carrying device 10. In this respect, the support members 34 project below the bottom surface 24, and can be in the form of feet or skirts or combinations thereof.

The rolling means 16 depend or project downwardly from the lower surface 22. Suitable rolling means include casters.

The retainer 18 projects upwardly from the upper surface 20 of the platform 14 and is configured to limit horizontal movement of the tray 12, or in all directions across the platform 12, when the tray is supported on the platform 14. In this respect, the retainer 18 presents a surface opposing all directions of movement of the tray 12 across the platform 14 when the tray 12 is supported on the platform 14.

When the tray 12 is supported on the load carrying device 10, the bottom surface 24 of the tray 12 is configured to clear the retainer 18 when the support members 34 are supported on the upper surface 20 of the platform 14. Further, support members 34 oppose and loosely abut the retainer 18 when the support members 34 are supported on the upper surface 20 of the platform 14. The retainer 18 is disposed inwardly of the perimeter 40 of the platform 14 relative to the support members 34.

In a preferred embodiment, the retainer 18 comprises a raised surface 36 disposed vertically above, and integrally joined by a retainer wall 38 to the upper surface 20 of the platform 14. The raised surface 36 is spaced inwardly from the perimeter 40 of the upper surface 20 of the platform 14, thereby defining a support surface on the upper surface 20 upon which the support members 34 of the tray 12 may rest upon. The raised surface 36 is configured to support the bottom surface 24 of the tray 12 when the support members 34 are supported on the upper surface 20 of the platform 14. To effect locking of the tray 12 to the platform 14, the retainer wall 38 is configured to oppose the support members 34 of the tray 12 when the support members 34 are supported on the upper surface 20 of the platform 14. When supported on the upper surface 20 of the platform 14, the support members 34 loosely abut the retainer wall 38 of the raised surface 36.

To mitigate buckling of the raised surface 36 when the raised surface 36 supports the bottom surface 24 of the tray 12, the raised surface 36 includes stiffening means 42. The stiffening means 42 can take the form of a plurality of ribs 44 intersecting a recessed channel 46 disposed in the raised surface 36 and extending adjacent the perimeter 48 of the raised surface 36. The recessed channel 46, with its intersecting ribs 44, can extend adjacent and substantially about the entire perimeter 48 of the raised surface. Alternatively, the stiffening means 42 can take the form of corrugations, convolutions, or undulations provided in the raised surface 36. To reduce weight of the load carrying device 10, as well as to save on material costs, a centrally disposed aperture 50 may be cut out of the platform 14 without affecting the functionality of the load carrying device 10.

The load carrying device 10 can be stacked with other like or identical load carrying devices 110, 210, as illustrated in FIG. 6. In this respect, the upper surface 20 of the platform 14 of the load carrying device 10 includes wells 52, configured to receive rolling means 16 of an identical load carrying device 110 when the identical load carrying device 110 or 210 is stacked upon the upper surface 20. Preferably, the wells 52 are disposed adjacent to the perimeter 40 of the upper surface 20 of the platform 14, and do not interfere with support of the trays 12 by the platform 14. The wells 52 on the upper surface 20 are aligned with the rolling means 16 depending from the lower surface 22, thereby facilitating stacking of multiple like or identical load carrying devices 110 or 210.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A load carrying device configured to transport a tray, the tray including a base having a bottom surface and a plurality of support members projecting below the bottom surface, the load carrying device comprising:

a platform having a support surface configured to support the support members;

rolling means depending from the platform; and a retainer comprising a retainer wall spaced inwardly from the perimeter of the platform and projecting above the support surface and being configured to oppose horizontal displacement of the tray when the support members are supported on the support surface, and a raised surface disposed vertically above and integrally joined by the retainer wall to the support surface;

wherein the raised surface is spaced inwardly from the perimeter and the support surface is disposed between the perimeter and the retainer wall, and wherein the raised surface is configured to provide support to the base of the tray when the support members are supported on the support surface, and wherein the raised surface includes a perimeter, and a recessed channel extending adjacent the perimeter, and stiffening means comprising a plurality of ribs intersecting the channel.

2. The load carrying device as claimed in claim 1, wherein the retainer is configured to oppose horizontal displacement of the tray when the support members are supported on the support surface.

3. The load carrying device as claimed claim 1, wherein in the retainer is configured to limit horizontal displacement of the tray when the support members are supported on the support surface, for maintaining the support of the support members by the support surface.

4. The load carry device as claimed in any of claims 2 or 3, wherein the support members loosely abut the retainer wall.

5. The load carrying device as claimed in claim 4, wherein the recessed channel extends adjacent and substantially about the entire perimeter wherein the stiffening means comprise a plurality of ribs intersecting the channel substantially about the entire perimeter.

6. The load carrying device as claimed in claim 1 or 5, wherein the raised surface includes an aperture spaced from the perimeter of the raised surface.

7. The load carrying device as claimed in claim 6, wherein the upper surface includes wells configured to receive rolling means of an identical load carrying device when the identical load carrying device is stacked upon the upper surface.

8. A load carrying device configured to transport a tray, the tray including a base having a bottom surface and a plurality of support members projecting below the bottom surface, the load carrying device comprising:

a platform having a support surface configured to support the support members;

rolling means depending from the platform; and a retainer comprising a retainer wall spaced inwardly from the perimeter of the platform and projecting above the support surface and being configured to oppose horizontal displacement of the tray when the support members are supported on the support surface, and a raised surface disposed vertically above and integrally joined by the retainer wall to the support surface;

wherein the raised surface is spaced inwardly from the perimeter and the support surface is disposed between the perimeter and the retainer wall, and wherein the raised surface is configured to provide support to the base of the tray when the support members are supported on the support surface, and, wherein the raised surface includes a perimeter, and a recessed channel extending adjacent the perimeter, and stiffening means defined by corrugations provided in the raised surface.

9. The load carrying device as claimed in claim 8, wherein the retainer is configured to oppose horizontal displacement of the tray when the support members are supported on the support surface.

10. The load carrying device as claimed in claim 8, wherein the retainer is configured to limit horizontal displacement of the tray when the support members are supported on the support surface, for maintaining the support of the support members by the support surface.

11. The load carry device as claimed in any of claims 9 or 10, wherein the support members loosely abut the retainer wall.

* * * * *